No. 726,575.  
PATENTED APR. 28, 1903.  
J. ROTHCHILD.  
VALVE.  
APPLICATION FILED SEPT. 9, 1901.  
NO MODEL.
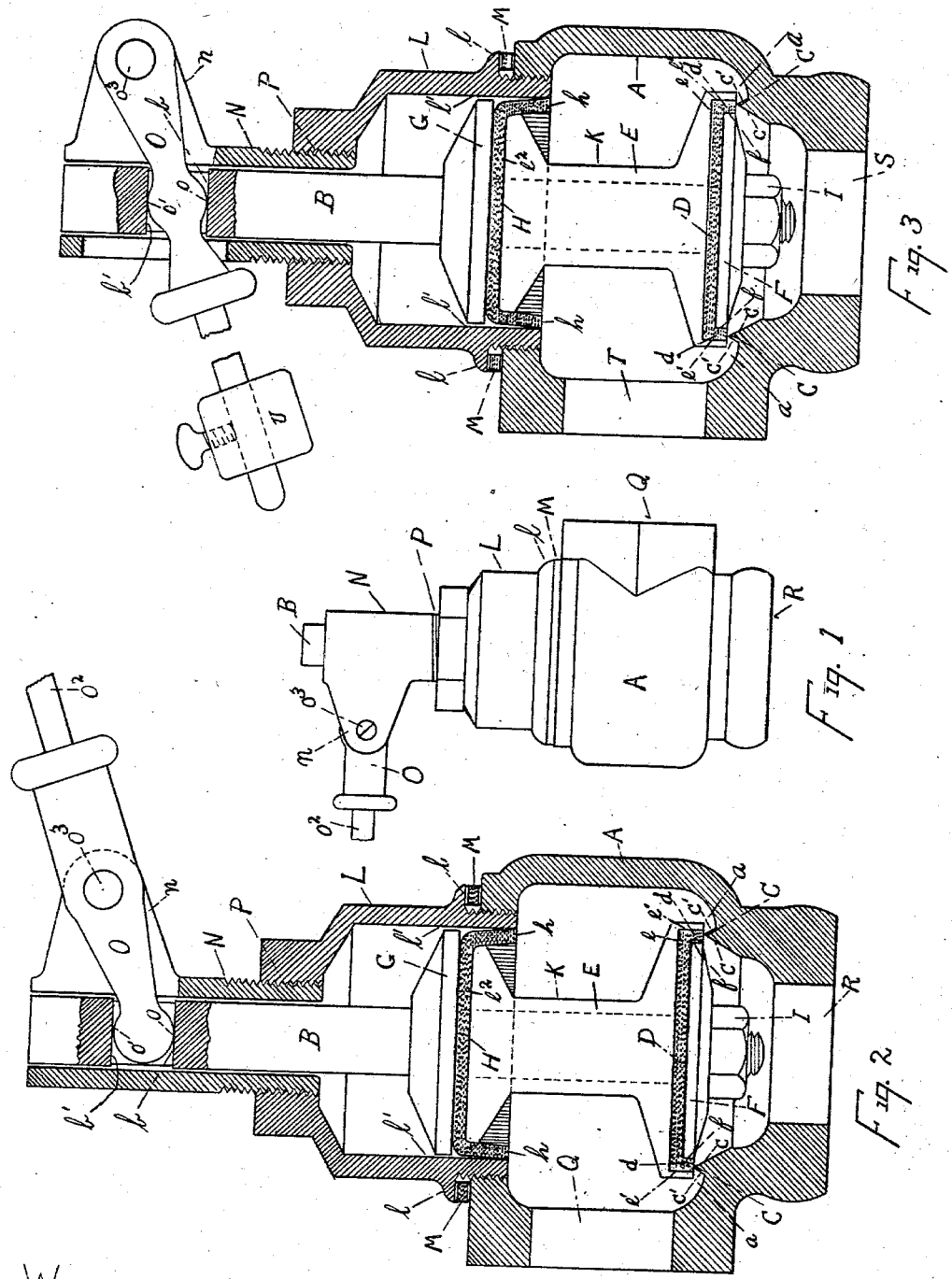
WITNESSES  
Ernest G. Simcoe  
Herbert F. Harden
INVENTOR  
Joseph Rothchild  
by B.F. Herbslet, his Attorney

UNITED STATES PATENT OFFICE.

JOSEPH ROTHCHILD, OF LOUISVILLE, KENTUCKY, ASSIGNOR TO W. E. CALDWELL AND W. E. CALDWELL CO., OF LOUISVILLE, KENTUCKY, A CORPORATION OF KENTUCKY.

VALVE.

SPECIFICATION forming part of Letters Patent No. 726,575, dated April 28, 1903.

Application filed September 9, 1901. Serial No. 74,812. (No model.)

*To all whom it may concern:*

Be it known that I, JOSEPH ROTHCHILD, a citizen of the United States, residing at Louisville, in the county of Jefferson and State of Kentucky, have invented certain new and useful Improvements in Valves, of which the following is a specification.

In the drawings, Figure 1 is a side elevation of my improved device. Fig. 2 is a longitudinal cross-section of the same. Fig. 3 is a longitudinal cross-section of the valve when used as a relief-valve.

A represents the casing or body of the valve; B, the valve-stem.

C is the valve-seat, which I have shown with inclined receding faces $c\ c'$, forming an elevated sharp seat, preferably annular, for forming a narrow contact-face for the valve. It is obvious that the sides of the valve-seat may be of any form for effecting the object of providing a valve-seat having a contact-face of comparatively narrow cross-section. A valve-disk D takes into a recess $e$ in a sleeve E, a washer F taking against the disk to confine the disk between the washer and sleeve. The valve-disk has an outer edge $d$ extending transversely of itself and taking between the outer edge $f$ of the washer and the wall $e'$ of the recess of the sleeve, and thereby forming a contact-face in the valve for the valve-seat. The valve-disk D is preferably made of a softer and preferably fibrous substance—such as leather, rubber, or substances having similar properties—and the confining-wall $e'$ and outer edge of the washer of some harder substance, such as brass or metal, although it is obvious that any substance may be used that will perform the office of the respective parts hereinafter more fully described.

The valve-stem B is provided with a shoulder G. A disk H, having transversely-extending edge $h$, forming a cup, is confined between the shoulder and an end face $e^2$ of the sleeve E. The valve-stem extends, preferably, through the valve-disk H, the sleeve, the disk D, and the washer F, the shoulder G being rigid with relation to the stem and the other parts mentioned being forced toward the shoulder by a nut I, taking over the screw-threaded end of the valve-stem B, the parts mentioned being confined between the nut and the shoulder. The sleeve has its middle portion cut away, as shown at K, forming a compensating area within the body of the valve—that is, a contact-surface for the fluid opposite the valve equal in area to the area displaced by the valve. A cap L is arranged to be screwed into the body A through an opening of sufficient diameter to permit the parts secured to the inner end of the valve-stem to be removed bodily without relative disarrangement of the parts on the stem. The cap is provided with a shoulder $l$, between which and the body A a packing M may be placed. The cap L has an internal seat $l'$ for the disk H or cup, the cup being self-compensating as to pressure, taking against the side or internal seat $l'$ with greater or less pressure, according to the greater or less pressure of the fluid. The valve-stem takes into an upwardly-extended hollow part or shank N. The valve-stem is provided with contact-faces $b\ b'$, against which the faces $o\ o'$ of a lever O take for causing the opening or closing of the valve. The lever O may have an extended shank $o^2$, to which a ball or other float may be attached in ordinary manner for actuating the valve-stem. The valve may also be actuated by hand or in any other manner preferred. The hollow extended part or shank N is arranged to screw into the cap L, as shown at P, forming an adjustable connection between the two, and thereby permits the shank to be turned for directing the lever O in any desired direction about the axis of the valve. The connection between the cap and the shank also permits the independent adjustment of the shank to height with relation to the valve-seat in order to throw the operating-lever to any desired angle—as, for instance, for determining the height to which the fluid may be permitted to rise before the float is called into action for cutting off the supply through the valve. The lever O is hung on a pivot $o^3$ in lugs $n$ of the shank. The adjustment between the body of the valve and the shank, in connection with the pivot, permits a universal adjustment between the valve-seat and lever. Thus in ordinary water-closet tanks the height to which the float in the tank is permitted to rise is determined by the height of the pivot $o^3$ above the valve-seat. The normal angle of the lever O with relation to the longitudinal axis of the stem B is adjusted and the elevation of the float and consequent quantity of water in the tank at the cut-off is determined by the adjustment of the pivot $o^3$, the float being also adjusted to proper position about the axis of the stem, so that the float may operate properly within the tank.

It will be noticed that the transversely-extending edge of the disk D which is of softer material is confined between surfaces of harder material, thereby forming a contact-face for the valve of softer material confined between harder substances for a valve-seat of harder material, and that but a narrow edge of the valve-seat makes contact with this softer material. The fluid passing through the valve is thereby when the valve is closed immediately cut off from passage through the valve by reason of the narrow edge of the valve-seat having contact made with it by the softer material of the valve confined between the harder materials, which latter construction prevents displacement of the softer material and confines it within prescribed limits. The narrow contact area between the valve and its seat also minimizes adhesion of the parts, insuring ease in operation and instant response to delicate pressure conditions.

I have made the area of the valve-seat of comparatively greater diameter than the inlet-opening for the fluid, so that little movement of the valve is necessary to provide an opening equal in area to the inlet-opening, which is shown at Q, the outlet-opening being indicated by R. The body of the valve is also enlarged at the valve-seat, as at $a$, for the free passage of the fluid.

The valve-disk D is preferably made of leather or other inexpensive material having its edge turned over at substantially right angles to the body of the disk and presenting its edge to the valve-seat. Confining the disk between harder materials insures longer life to the valve-disk, and the disk being made of inexpensive material is replaced readily and with little expense, and the valve being constructed with its stem, disks, sleeve, and washer removable as an entirety permits ready access to the parts for repairs and replacement of the parts.

I have hereinbefore described the valve principally as a so-called "float-valve," although it is obvious that parts of the same may be used in connection with other kinds of valves.

I will now describe the same as used as a relief-valve, reference being made to Fig. 3 of the drawings. S denotes the entrance-port of the relief-valve, and T the exit-port of the same, the passage of the liquid being the reverse of that when the valve is used as a float-valve. When used as a relief-valve also, the lever O is extended in the opposite direction and a weight U hung upon the shank of the lever, with the contact-faces on the lever for the faces of the stem between the fulcrum and the weight. The weight is arranged to slide on the shank of the lever and be fastened at any desired point for determining the pressure at which the valve shall afford relief. If the pressure becomes sufficient to more than counterbalance the weight, the valve-stem will be raised, the fluid taking into the balance area and passing out of the exit-opening T. In this connection it will be noted also that the valve-seat is of substantially greater area than the entrance-port, so that little movement of the valve-stem is necessary for permitting the passage of the fluid. When used as a relief-valve, the balance area being provided permits the valve to be used in such manner as to relieve at a predetermined pressure and convey the fluid when a greater pressure is reached to any desired point attainable by the initial pressure. Protecting the soft contact material of the valve by the hard material at either side thereof prevents displacement of the soft material by the current.

I claim—

1. In a valve, the combination of a casing having a port and provided with a raised valve-seat surrounding said port and a valve formed of a piece of soft sheet material the marginal portion of which is bent downward and forms an annular depending part, the lower edge of which is extended in a plane parallel with the valve-seat and adapted for contact with said valve-seat and two parts of harder material arranged, respectively, inside and outside of said softer portion and between which said softer portion is held, substantially as set forth.

2. In a valve, the combination of a casing having a valve-seat, a cap having threaded engagement with said casing and provided with a chamber adapted for communication with the interior of the casing, a hollow part extended above and having threaded engagement with the cap, a valve-stem passed through the hollow of said part and through the chamber of the cap into the interior of the casing, a lever pivotally held on said hollow part and having connection with said stem, an enlargement on the valve-stem, a sleeve on the valve-stem below said enlargement and provided with a reduced central portion, a disk of soft material held on the valve-stem between the enlargement and the upper end of said sleeve with its edge portions directed downwardly outside of the said sleeve and adapted for contact with the walls of the chamber in the cap, and a valve carried on the valve-stem at the lower end of said sleeve and adapted for contact with the valve-seat, substantially as set forth.

In testimony whereof I have signed my name hereto in the presence of two subscribing witnesses.

JOSEPH ROTHCHILD.

Witnesses:
ERNEST G. SIMON,
HERBERT F. HARDEN.